United States Patent
Wexler

(12) 
(10) Patent No.: US 6,227,148 B1
(45) Date of Patent: *May 8, 2001

(54) APPARATUS AND METHOD FOR ENCAPSULATING AN ANIMAL'S HEAD

(76) Inventor: Toby Wexler, 303 Paddington, Lafayette, LA (US) 70508

( * ) Notice: Subject to any disclaimer, the term of this patent is extended or adjusted under 35 U.S.C. 154(b) by 0 days.

This patent is subject to a terminal disclaimer.

(21) Appl. No.: 09/557,259

(22) Filed: Apr. 24, 2000

Related U.S. Application Data

(63) Continuation-in-part of application No. 09/433,527, filed on Nov. 3, 1999, now Pat. No. 6,082,309.

(51) Int. Cl.[7] .................................................... A01K 25/00
(52) U.S. Cl. ............................................................. 119/837
(58) Field of Search .................................. 119/815, 821, 119/823, 831, 832, 837

(56) References Cited

U.S. PATENT DOCUMENTS

| | | |
|---|---|---|
| 4,252,084 | 2/1981 | Schenck . |
| 5,136,984 | 8/1992 | Askinasi . |
| 5,299,531 | 4/1994 | Dietz . |
| 6,082,309 | * 7/2000 | Wexler ................................. 119/837 |

* cited by examiner

*Primary Examiner*—Thomas Price
(74) *Attorney, Agent, or Firm*—Robert N. Montgomery

(57) ABSTRACT

An animal muzzling apparatus generally for temporary use during treatment and grooming of an animal to prevent injury to attending personnel due to bites, the muzzle being transformable into a gas mask and a "V" neck collar. The apparatus being generally a transparent globular shape in standoff relationship with and fully enclosing an animal's head, the enclosure having sufficient air breathing holes or slots therein and a slotted elastic membrane for allowing the globe to be quickly and easily extended over the head of the animal. The globe may be fitted with a flexible sleeve encircling the slotted, elastic membrane, extending around the animal's neck and secured thereabouts with a quick draw string having a quick lock or by alternative neck securing device. The globe may optionally be fitted with a removable front cover. The cover may be fitted with a an adapter membrane to seal the globe and adapted to receive a gas hose connection. The globe may be hinged in a manner that allows access to the animal's head or simply divided into upper and lower hemispheres with an removable upper portion for administering medication and treatment to the animal's head or preventing licking or biting at wounds or dressings.

11 Claims, 8 Drawing Sheets

APPARATUS AND METHOD FOR ENCAPSULATING AN ANIMAL'S HEAD

This is a continuation-in-part of U.S. application Ser. No. 09/433,527 field Nov. 3, 1999, now U.S. Pat. No. 6,082,309.

BACKGROUND OF THE INVENTION

1. Field of the Invention

This invention relates generally to animal muzzles and head restraints and more particularly to the muzzling and encapsulation of the head of biting animals, in particular canines and felines, in a manner that prevents injury to treatment personnel and animal alike and includes adaptation for administering gas and use as a cupped collar.

2. General Background

As is generally known, many animals kept as pets, especially cats, are widely known to be quite fierce when being restrained. Such animals are required by law to undergo veterinary checkups for immunization against various diseases, as well as the fact that a pet owner generally brings these animal to veterinarians for routine treatment. It is known that animals such as dogs and cats become extremely nervous and agitated in the presence of unknown surroundings and strange smells. Accordingly, the animal may attack or strike the veterinarian, the owner, or various other staff members, thereby causing injury and, thus, subjecting the practitioner to liability. In order to prevent such injuries, many veterinarians employ conventional muzzles that are well known and accepted within the prior art. It has been determined that a pet owner becomes extremely concerned in regard to the safety of their animal when such muzzles are employed in their presence since extreme force is often used in their application. Many muzzles existing in the prior art are relatively complicated, unattractive devices and create a great feeling of apprehension in regard to the pet owner when employed to restrain the pet. Examples of such typical muzzles may be obtained by reference to U.S. Pat. Nos. 4,252,086, 5,136,984 and 5,299,531. Essentially, the prior art muzzles consist of a sleeve of some type and plurality of straps and restraining members which are placed about the snout of the animal and secured about the head of the animal by means of a plurality of fastening devices. As indicated, many pet owners seriously object to the use of such muzzles and, hence, make it difficult for the veterinarian to optimally and adequately administer to the physical needs of the animal without sustaining injury. Since pet owners often assist in controlling the animal while being examined by the veterinarian, the application of such devices often causes the animal to inflict injury to the pet owner, thus increasing veterinarian liability.

As acknowledged by the prior art patents, there are few known muzzles which are available in the marketplace to restrain or to muzzle a cat. The necessity of doing so is apparent as cats have extremely sharp teeth which are capable of inflicting severe injuries.

Many prior art muzzles severely restrict the breathing capability of animals as a result of the muzzle rotating relative to the animal's head. This is an extreme disadvantage in a veterinary examination since the animal, due to anxiety and so on, breathes more rapidly due to restriction by the muzzle. Therefore, it stands to reason that a muzzle should allow the animal to breathe as optimally as possible and be applied rapidly and easily without undue stress.

According to Schenek in U.S. Pat. No. 4,252,086, it is further desirable for the muzzle to be capable of covering the eyes of the animal as well as its mouth, especially in the case of felines, to produce a calming effect on the animal. However, in fact, such devices have been found to further traumatize the animal and are extremely difficult to administer, severely restrict breathing, and prevent visual inspection of the animal's eyes and head during the examination.

Other devices are used for animal body restraints and specifically designed for cats such as is disclosed by Salvatore in U.S. Pat. No. 5,020,478. However, such devices, while confining the animal generally, only provide access to the animal's head. Other devices which utilize a wire cage arrangement to fully contain the body fail to allow access to the animal's front feet without exposure to its sharp teeth.

It is therefore an object of the present invention to provide an improved muzzle or head restraint which allows for fast and easy application, better breathing and head control while allowing visual head examination. The device thereby avoids the many disadvantages associated with prior art muzzles.

In addition, the muzzle may be converted to a gas treatment mask whereby the animal may be anesthetized, euthananized, given oxygen, or other such gas treatment.

SUMMARY OF THE INVENTION

A muzzle or head encapsulation apparatus for animals undergoing veterinary treatment in the form of a transparent globe for providing standoff encasement of the animal's head. The globe or encasement having sufficient air breathing slots therein and a slotted, elastic membrane for allowing the globe to be quickly and easily extended over the head of the animal. The globe is further fitted with a flexible sleeve encircling the slotted, elastic membrane, extending around the animal's neck and secured thereabouts with a quick drawstring type gathering collar having a quick locking apparatus for securing the drawstring to prevent removal. The drawstring collar may also be used to help restrain the animal. The globe may optionally be fitted with a removable front cover for allowing access to the animal's head for administering medication and treatment to the animal's head. The Globe further allows the animal's head to be positioned readily relative to the body. The animal is fully aware of its surroundings and thus not traumatized any more than necessary. The apparatus is applied very rapidly by simply placing the container over the animal's head and drawing the draw string, thus leaving the animal very little time to react. Although the head globe may be left on the animal for some period of time without attendance, it is generally used during treatment while the animal is otherwise being restrained. In such cases, the globe or stand-off head covering may be utilized to administer gas treatment as well.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
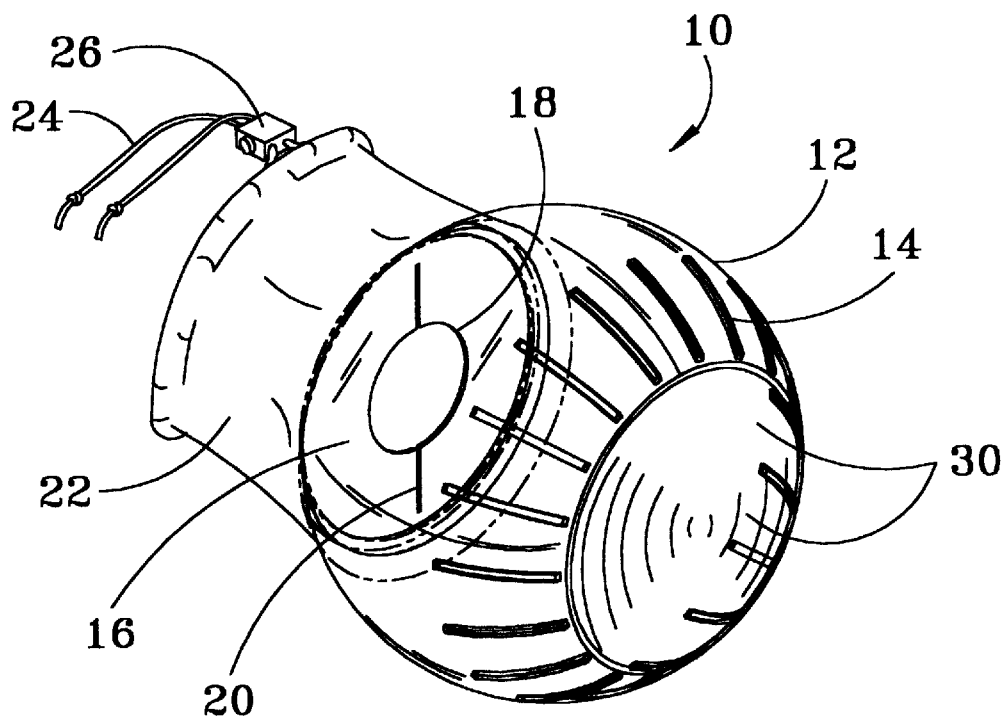
FIG. 1 is a front isometric view of the preferred embodiment.
Figure 2:
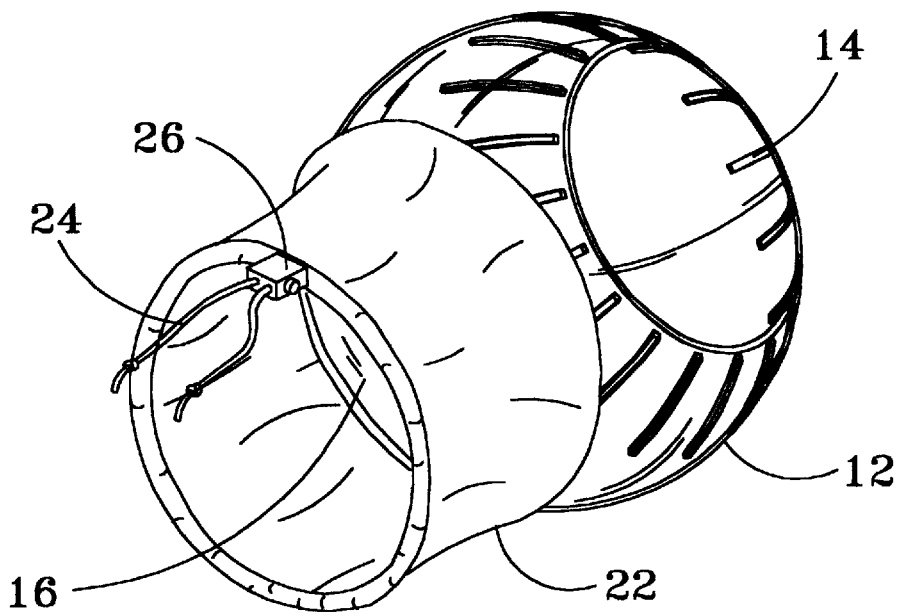
FIG. 2 is a rear isometric view of the preferred embodiment.

As illustrated in FIG. 1, the animal head covering 10 serving as a muzzle is a spherical shaped globe 12 having a numerous slots 14 located in the forward or frontal or upper hemisphere that permit sufficient air into the globe 12. The slots 14 are sized and located to allow free flow of air to the animal's nose and prevent their claws from engaging in the animals attempt to remove the globe 12. The globe 12 is generally made of a light weight, transparent or semitransparent, polymeric material sized to accommodate the average cat's head. However, various models are provided to accommodate dogs and smaller animals, such as kittens and wild animals, or larger wild felines. The globe 12 may also be lightly tinted to provide a more calming effect on the animal. The rear or lower hemisphere of the globe 12 has a relatively large opening covered by a flexible polymeric membrane 16 having a smaller diameter opening 18 therein and slits 20 extending outwardly therefrom to allow penetration by an animal's head. A flexible sleeve 22 surrounding the membrane 16, as shown in FIG. 2, is attached to the globe 12 and or the membrane 16 itself and extends outwardly from the globe 12. The sleeve 22 is fitted with a drawstring 24 having a locking buckle or slip lock 26 to prevent unwanted release of the string. In some cases the sleeve 22 may be folded back over the globe 12, thereby exposing the opening to the membrane and thus facilitating rapid placement over the animal's head.

Figure 3:
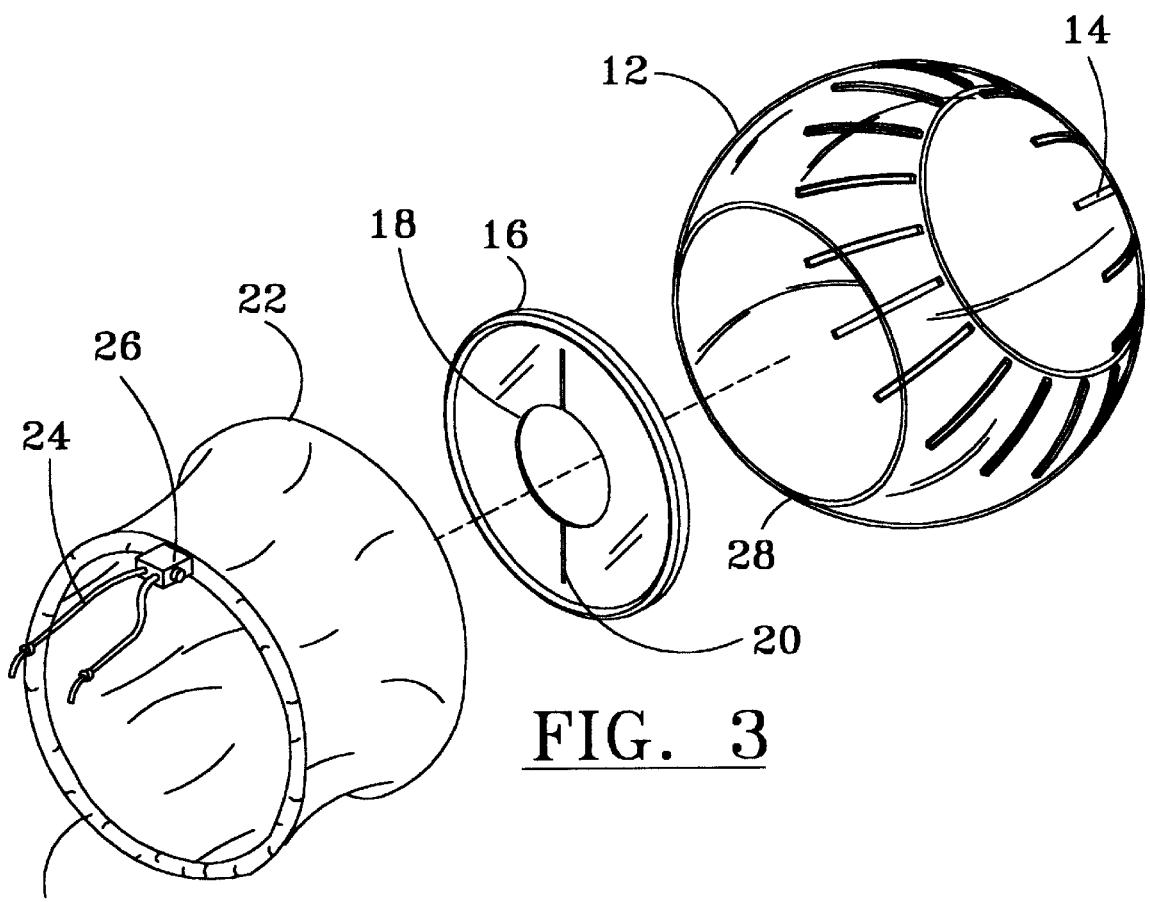
FIG. 3 is an exploded isometric view of the embodiment shown in FIG. 2.
Figure 4:
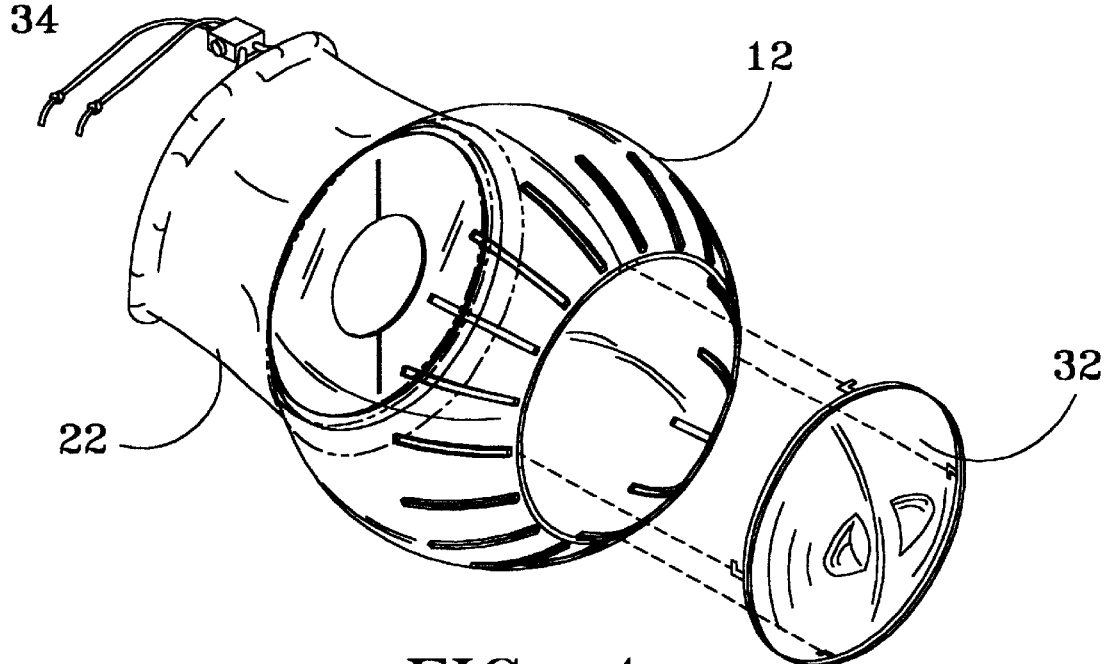
FIG. 4 is a front isometric view of an optional embodiment.
Figure 5:
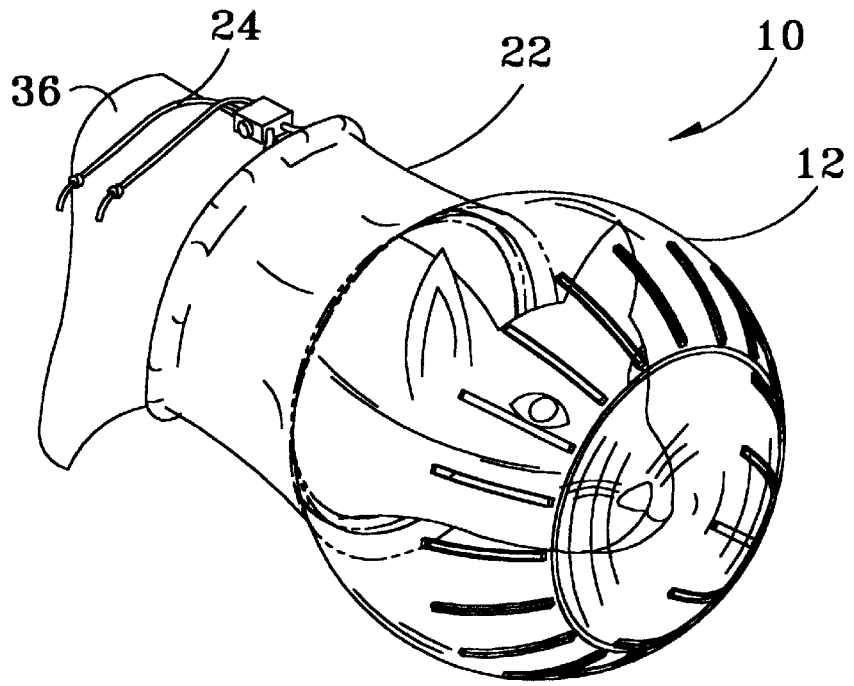
FIG. 5 is a front isometric view of the embodiment shown in FIG. 1 installed on a cat.

As illustrated in FIG. 3, the transparent globe 12 is assembled by adhering the cupped flexible membrane 16 to the globe 12 covering the opening 28 therein. It should be noted that the end opposite the opening 28 is a clear dome portion formed as part of the globe 12. However, this dome portion 30, best seen in FIG. 1, may be cut and removed and replaced with a cover 32 as shown in FIG. 4. The sleeve portion 22 may be made from a any flexible, synthetic material, such as vinyl or nylon, and attached to the membrane 16 prior to its attachment to the globe 12, adhered directly to the globe 12 around the membrane 16 or secured as part of the assembly of membrane attachment to the globe 12. The sleeve 22, preferably having a hem 34 around one end allows for the insertion of the drawstring 24. The ends of the drawstring 24 may be secured in a manner that prevents retraction into the hem and further equipped with a buckle or slip lock apparatus 26 that locks the drawstring 24 in infinite adjustable positioning upon closure of the sleeve 22 around the animal's neck 36 as seen in FIG. 5. The ends of the drawstring may also be tucked under the sleeve, thus preventing entanglement with the animal's toe nails when not being restrained. The drawstring forming a type of collar with the string serving as a lead for further controlling the animal.

As mentioned above, the upper hemisphere of the globe 12 seen in FIG. 4 may be fitted with a removable face plate or cover 32. This cover is a snap in and twist lock type cover which, when removed, allows access to the animal's head. The cover may also be removed to allow cleaning and greater ventilation if the animal is subjected to long periods of treatment or is recovering from surgery, thus allowing trachea tubes, medications, etc. to be employed. In any case the globe prevents the animal from harming itself and others.

Figure 6:
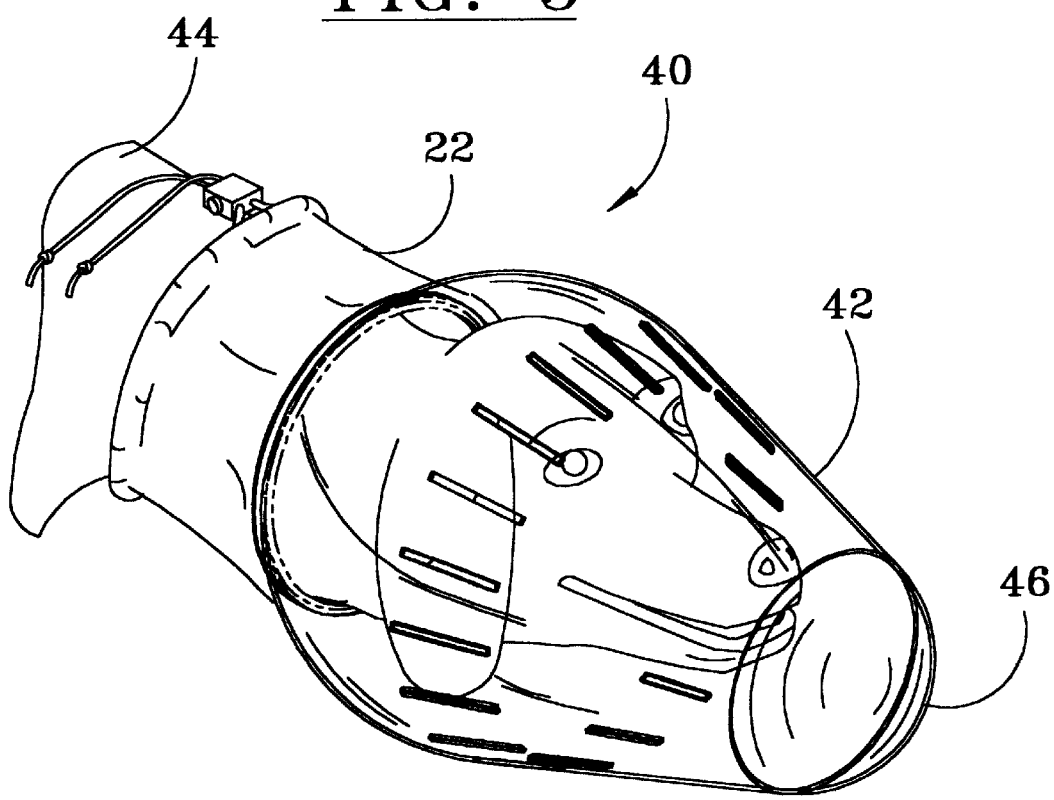
FIG. 6 is a front isometric view of an optional embodiment for use with dogs.

Animals with long snouts, such as dogs 44, may require an extended upper hemisphere 42 portion, such as that shown in FIG. 6. This embodiment 40 provides an animal with adequate space for its snout without restraining the animal's ability to open its mouth to pant, etc. It is anticipated that in this case the vents may be larger and longer to allow for greater air circulation and drainage of saliva. The membrane may be modified to accept the larger heads of dogs and the like. Again, the dome portion maybe made removable in some cases, if desirable.

Figure 7:
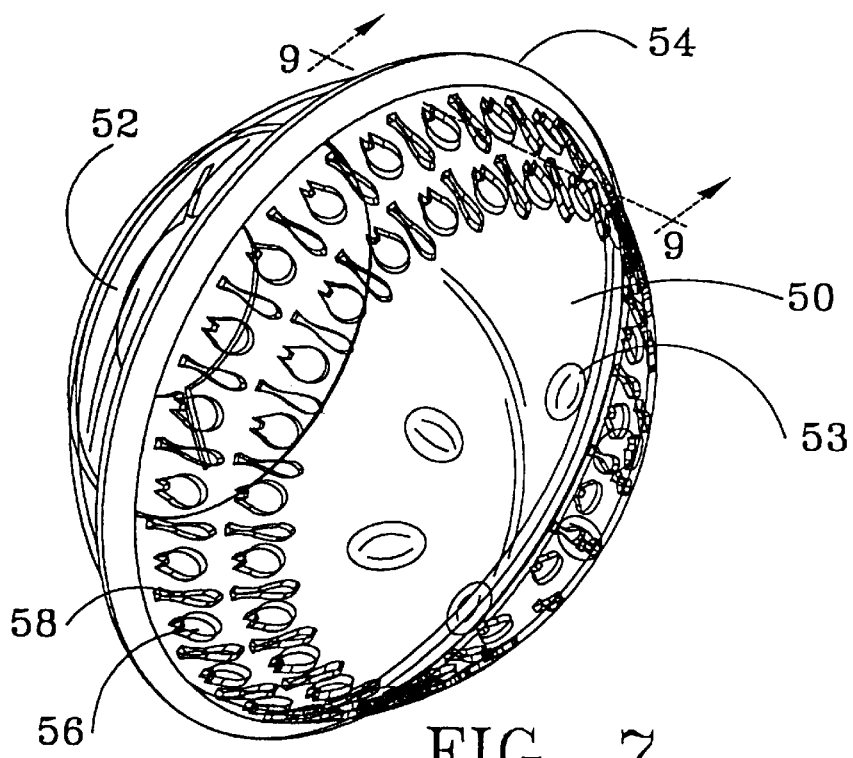
FIG. 7 is a front isometric view of a second embodiment of the invention.
Figure 8:
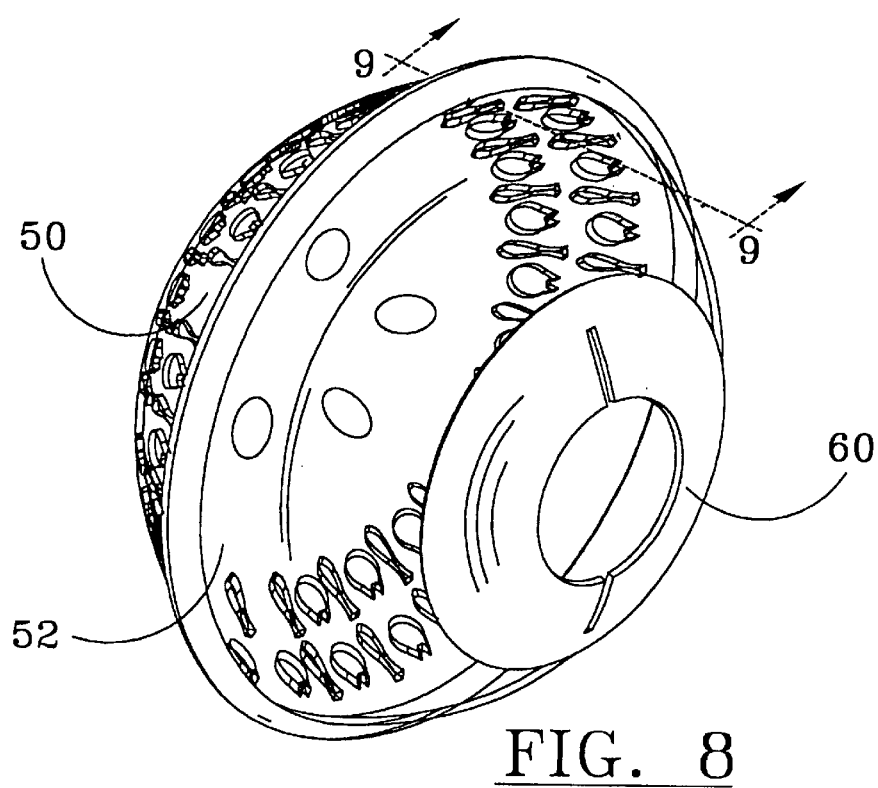
FIG. 8 is a rear isometric view of the second embodiment shown in FIG. 7.
Figure 9:
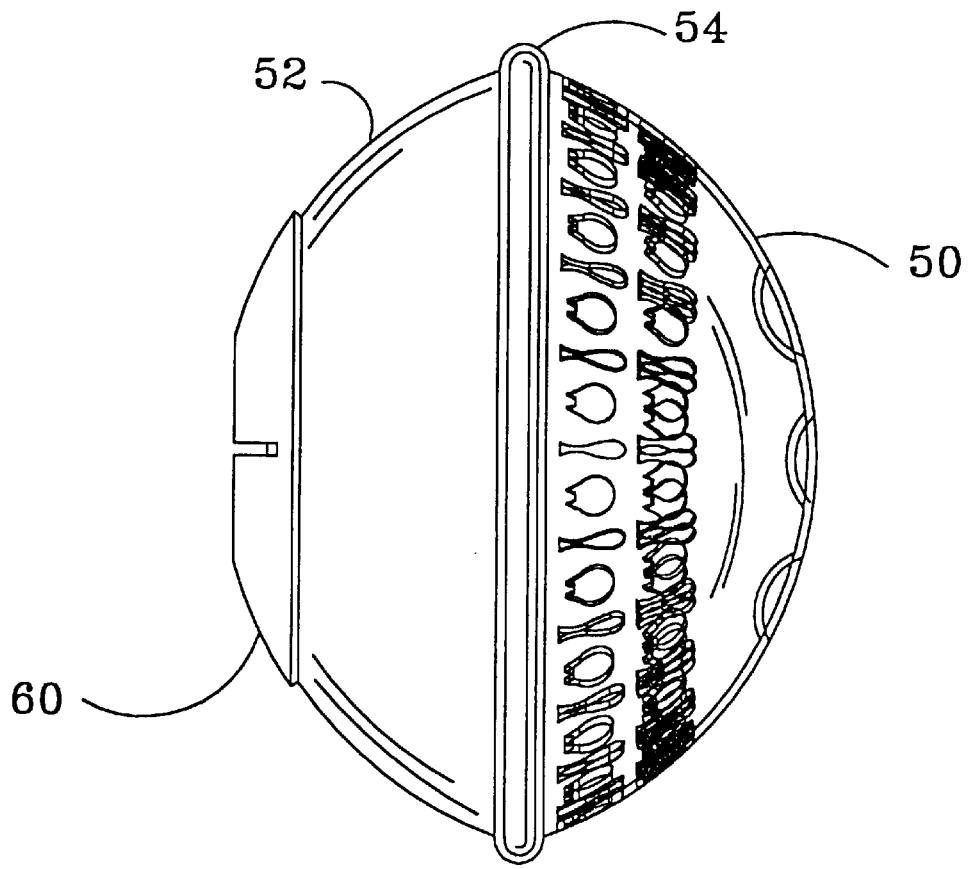
FIG. 9 is a side elevation view of the second embodiment shown in FIG. 7.
Figure 11:
FIG. 11 is a geometric illustration of one series of ventilation holes seen in FIGS. 7–9.
Figure 10:
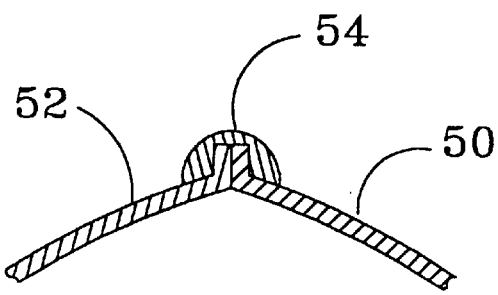
FIG. 10 is a partial cross section view taken along sight line 9—9 shown in FIG. 7.
Figure 12:
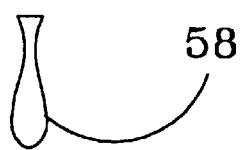
FIG. 12 is a geometric illustration of a second series of ventilation holes seen in FIGS. 7–9.

The head covering 10 may also be configured geometrically as seen in FIG. 7 whereby the upper and lower hemispheres are more elliptical shaped when viewed from a side elevation view as seen in FIG. 9. The upper and lower half portions 50, 52 are retained at the equator as shown in FIG. 10 by a polymeric ring 54. The upper half portion having a plurality of holes having various irregular geometric shapes 56,58, as illustrated in FIGS. 11 and 12 as cat head and fish shaped. Other hole shapes may be used as desired. The upper half portion 50 further includes a series of finger depressions 53 arranged to allow the user's fingers to obtain a positive purchase on the head covering 10 when applying the covering to the animal. The lower half portion 52 is also fitted with a flexible boot 60 similar to that of item 16 illustrated in FIG. 3.

The more flattened shape of the second embodiment shown in FIG. 7 moves the center of gravity of the covering closer to the animals head thus preventing the covering from being top heavy. This configuration works well with smaller animals and allows the head to be manipulated more easily.

Figure 13:
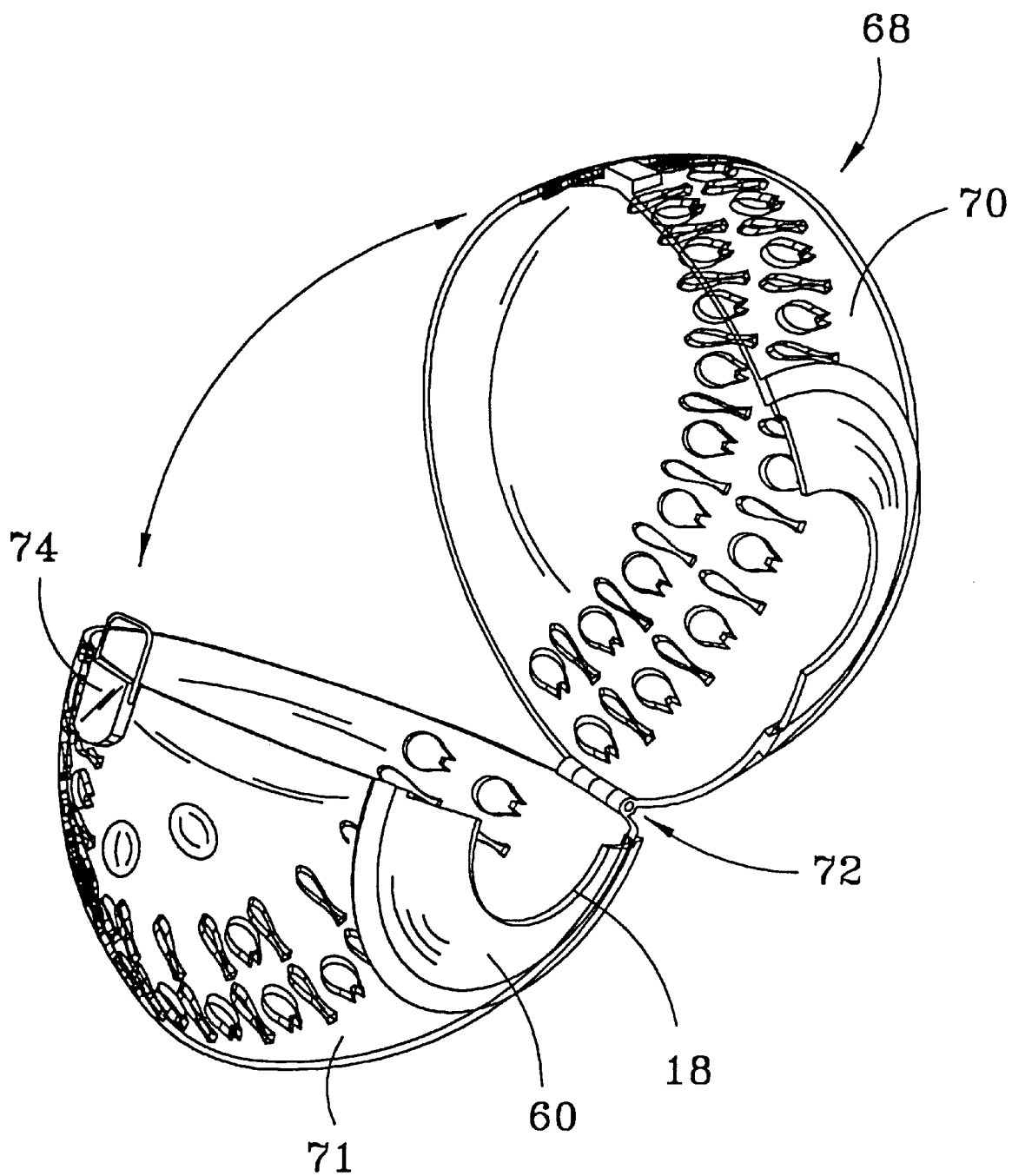
FIG. 13 is an isometric view of a third embodiment of the invention divided axially and hinged.

In some cases such as with dogs it may be more feasible to provide a head covering similar to that discussed above with the exception of dividing the globe axially along a plane extending from polar region to polar region into two hemispheres 70, 71 and hinging the two hemispheres as seen in FIG. 13. In this manner the head covering is parted axially through the polar caps including the flexible membrane 60 serving as a collar and the two hemispheres held in close proximity with each other by a hinge assembly 72 and a latch assembly 74. This configuration allows the covering 68 to be placed about the animals head and snapped closed thereby negating the need to pass the animals head through the membrane central opening 18.

Figure 14:
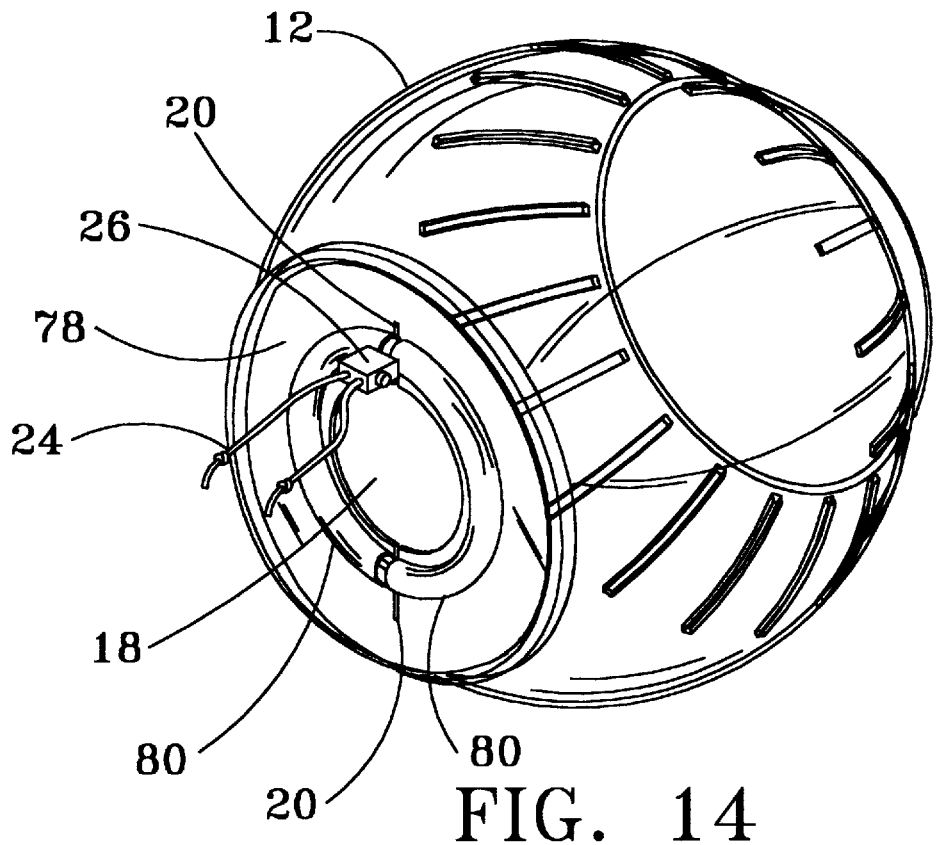
FIG. 14 is an isometric view of an alternate embodiment of the embodiment illustrated in FIG. 5.
Figure 15:
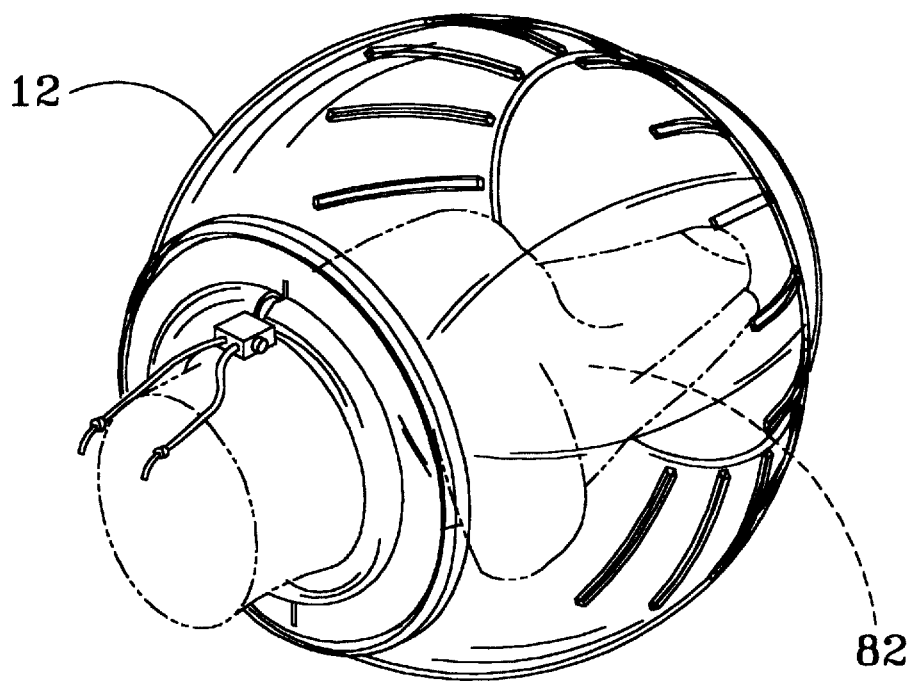
FIG. 15 is an isometric view of an alternate embodiment of the embodiment illustrated in FIG. 6.

Alternatively, as seen in FIG. 14, the globe 12 may be fitted with a flexible, polymeric membrane 78 essentially the same as item 16 except fitted with a tunnel 80 located adjacent each side of the opening 18. The tunnel is divided into semicircles located on each side of the slits 20. By passing the drawstring 24 through each of the tunnels 80 and through the slip lock 26, an effective closing of the opening 18 may be accomplished by chinching the drawstring so that the slits 20 are effectively prevented from reopening, thus preventing the animal's head 82, shown inside the globe 12, from being withdrawn as shown in FIG. 15. Therefore, as demonstrated herein, it is anticipated that any number of methods may be employed to secure the globe 12 to the animal's head and still be within the scope of the invention.

Figure 16:
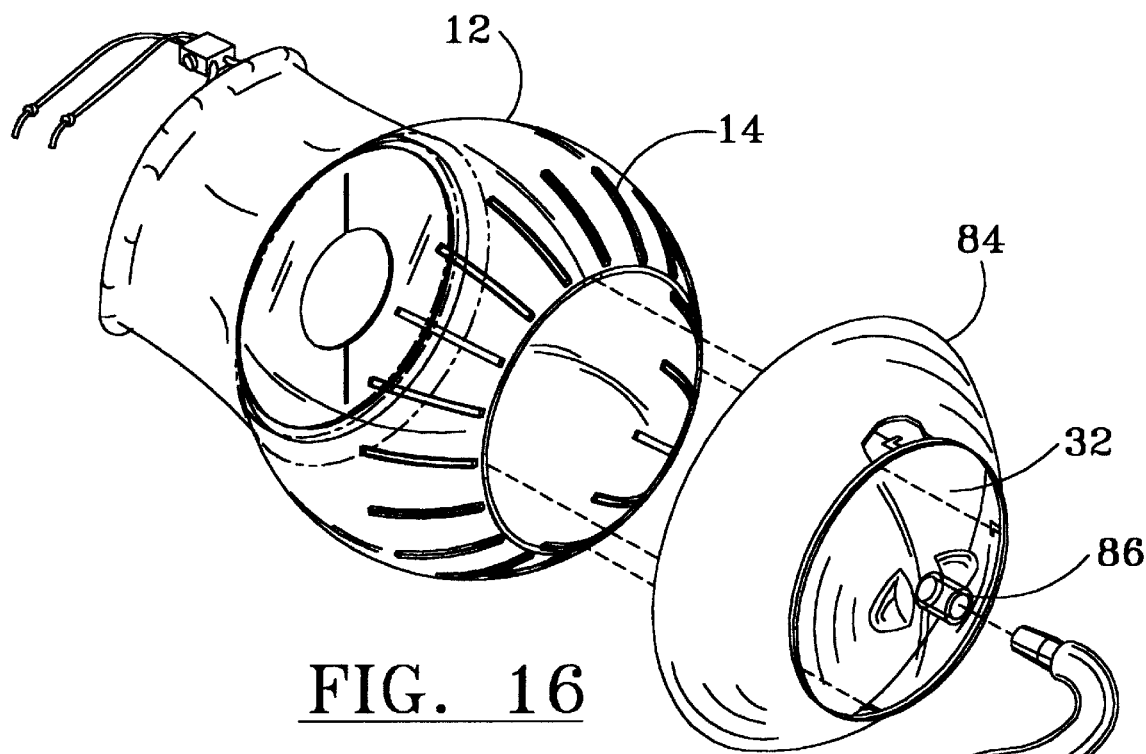
FIG. 16 is an isometric view of an alternate embodiment of the embodiment illustrated in FIG. 4.

An alternative use for the muzzle as seen in FIG. 16 may be accomplished by fitting a flexible, polymeric member or skirt 84 to the front cover 32 seen in FIG. 4 and providing the cover with an orifice for adapting a hose adapter 86 for attaching a gas hose 88. The flexible member covers the air slots 14 located in the globe 12 when the face plate 32 is locked into position, thereby making the globe 12 gas tight. Gas may then be supplied to the animal via the gas hose 88 from any available gas supply source in much the same manner as is the current practice using a gas or breathing mask.

Figure 17:
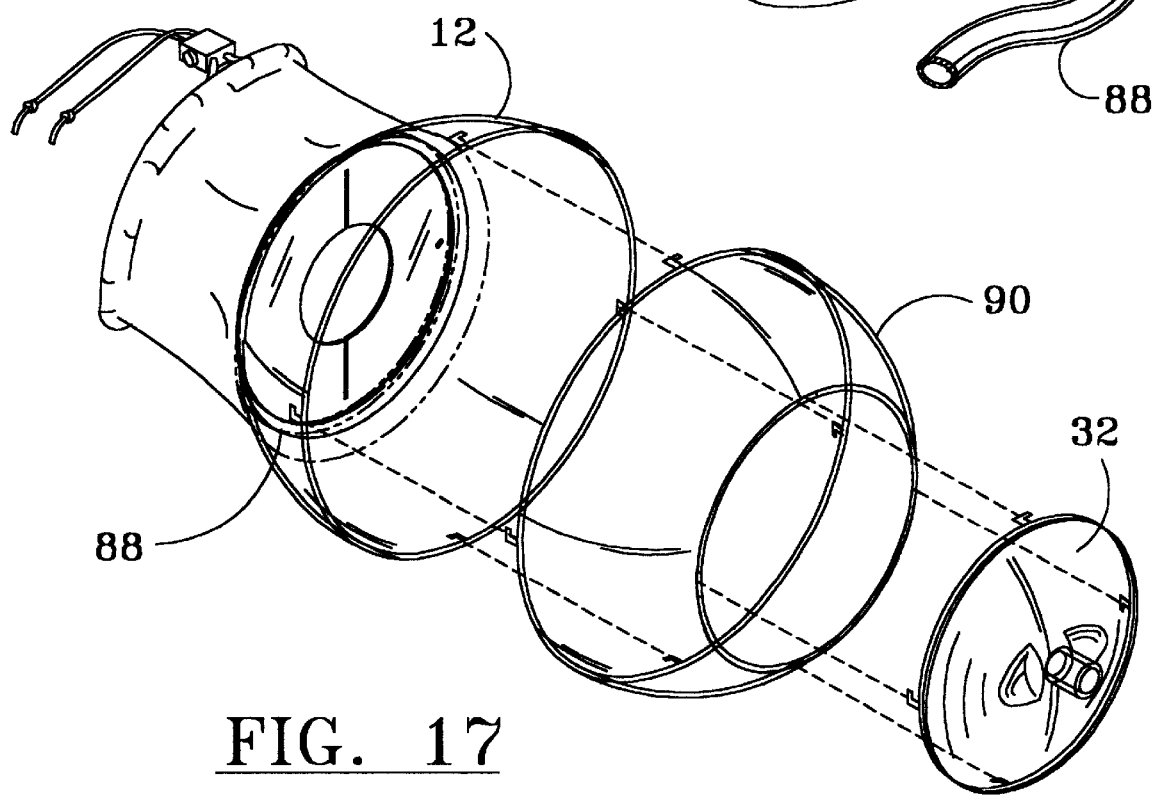
FIG. 17 is an isometric view of another alternate embodiment of the embodiment illustrated in FIG. 4.

Yet another alternative is illustrated in FIG. 17, wherein a method for removal of the upper hemisphere is illustrated. In this case, the globe 12 is divided equatorially into upper and lower hemispheres, the upper hemisphere 90 being removably attached to the lower hemisphere 88. With the upper hemisphere removed, the globe 12 is transformed into a cupped or cone-shaped collar which can then be used to prevent the animal from licking or biting at wounds or dressings, yet still leaves the animal's head exposed for easier access and breathing. However, the upper hemisphere may be reapplied at any time to return the globe 12 to muzzle or gas mask configuration. Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An animal head covering for use in veterinary examination of small animals comprising:
    a) a globular enclosure having upper and lower hemispherical portions, each said hemispherical portion having a polar dome region, each said upper and lower hemispherical portion having a diametrical opening in at least a portion of said polar dome region;
    b) a flexible member attached to at least one of said hemispherical portions covering said diametrical opening in at least one said hemispherical portion said flexible member having a diametrical opening therein and a plurality of slits extending outwardly therefrom; and
    c) a detachable cover plate adapted to dose said diametrical opening in said polar region of at least one of said hemispherical portions.

2. The animal head covering according to claim 1 wherein said flexible member comprises a means for securing said flexible member around the neck of said animals in a manner whereby the animal's head is prevented from withdrawal from said globular enclosure.

3. The animal head covering according to claim 1 wherein said flexible member covers a substantial portion of at least one of said hemispherical portions.

4. The animal head covering according to claim 1 wherein said detachable cover plate comprises a diametrical opening therein.

5. The animal head covering according to claim 4 wherein said diametrical opening further comprises a hose adapter fitting adapted to said diametrical opening in said detachable cover plate.

6. The animal head covering according to claim 1 wherein said upper and lower hemispherical portions are detachable.

7. The animal head covering according to claim 1 wherein said detachable cover plate further comprises a flexible, polymeric skirt.

8. The animal head covering according to claim 7 wherein said flexible skirt covers a substantial portion of at least one of said hemispherical portions and is capable of rendering said globular enclosure gas tight.

9. A method for transforming a stand-off globular enclosure type muzzle for use as a gas mask comprising the steps of:
    a) providing a globular enclosure comprising:
        i) an upper and lower hemispherical portion, each said hemispherical portion having a polar dome region, each said upper and lower hemispherical portion having a diametrical opening in at least a portion of said polar dome region;
        ii) a flexible member attached to at least one of said hemispherical portions covering said diametrical opening in at least one said hemispherical portion, said flexible member having a diametrical opening therein and a plurality of slits extending outwardly therefrom;
        iii) a detachable cover plate having a orifice therein, the cover plate adapted to close said diametrical opening in said polar region of at least one of said hemispherical portions;
        iv) a hose fitting adapted to said orifice in said cover plate,
    b) connecting a gas supply to said hose fitting.

10. The method according to claim 9 further comprising the step of adapting a flexible skirt to said detachable cover plate in a manner whereby said flexible skirt seals air holes in said globular enclosure when said cover plate is attached to said globular enclosure.

11. A method for transforming a stand-off globular enclosure type muzzle for use as a cupped collar for partially enclosing the head of an animal to prevent licking and biting of a wound comprising the steps of:
    a) providing a globular enclosure comprising:
        i) an upper and lower hemispherical portion adapted to be detachable one from the other, each of said hemispherical portions having a polar dome region, each of said hemispherical portions having a diametrical opening in at least a portion of said polar dome region;
        ii) a flexible member attached to at least one of said hemispherical portions covering said diametrical opening in at least one said hemispherical portions said flexible member having a diametrical opening therein and a plurality of slits extending outwardly therefrom; and
        iii) a means for securing said flexible member around an animal's neck in a manner that prevents the animal from withdrawing its head from said enclosure; and
    b) detaching and removing said upper hemispherical portion from said lower hemispherical portion of said globular enclosure.

* * * * *